United States Patent
Zhang et al.

(10) Patent No.: US 9,286,230 B1
(45) Date of Patent: Mar. 15, 2016

(54) SPARSE VOLUME MANAGEMENT CACHE MECHANISM SYSTEM AND METHOD

(71) Applicant: EMC Corporation, Hopkinton, MA (US)

(72) Inventors: Ye Zhang, Shanghai (CN); Jean-Pierre Bono, Westborough, MA (US); William C. Davenport, Burlington, MA (US); Yining Si, Shewsbury, MA (US); Qi Mao, Shanghai (CN); Alexander M. Daniel, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 91 days.

(21) Appl. No.: 14/211,736

(22) Filed: Mar. 14, 2014

Related U.S. Application Data (63) Continuation of application No. 61/782,061, filed on Mar. 14, 2013.

(51) Int. Cl.
*G06F 13/00* (2006.01)
*G06F 12/08* (2006.01)
*G06F 3/00* (2006.01)

(52) U.S. Cl.
CPC .................................. *G06F 12/0891* (2013.01)

(58) Field of Classification Search
CPC ........ G06F 13/00; G06F 3/00; G06F 2003/00
USPC .................................................. 711/118, 130
See application file for complete search history.

(56) References Cited

U.S. PATENT DOCUMENTS

| | | | | |
|---|---|---|---|---|
| 6,748,501 | B2 * | 6/2004 | Arimilli et al. | 711/155 |
| 7,725,437 | B2 * | 5/2010 | Kirshenbaum et al. | 707/640 |
| 8,001,330 | B2 * | 8/2011 | Clark et al. | 711/130 |
| 8,996,807 | B2 * | 3/2015 | Joshi et al. | 711/117 |
| 2002/0087815 | A1 * | 7/2002 | Arimilli et al. | 711/155 |
| 2012/0210066 | A1 * | 8/2012 | Joshi et al. | 711/118 |
| 2012/0210068 | A1 * | 8/2012 | Joshi et al. | 711/122 |
| 2013/0040275 | A1 * | 2/2013 | Gowda | 434/322 |
| 2014/0012940 | A1 * | 1/2014 | Joshi et al. | 709/214 |
| 2014/0189239 | A1 * | 7/2014 | Hum et al. | 711/122 |

* cited by examiner

*Primary Examiner* — Christopher Shin
(74) *Attorney, Agent, or Firm* — Brian J. Colandreo; Mark H. Whittenberger; Holland & Knight LLP (57) ABSTRACT

A method, computer program product, and computer system for instantiating, by a computing device, a slice-object associated with a slice when the slice-object is accessed. The slice-object is released to a slice object cache when accessing is complete. It is determined whether the slice is accessed within a threshold period of time. If the slice is accessed within the threshold period of time, the slice-object is retrieved from the slice-object cache. If the slice is not accessed within the threshold period of time, memory used for the slice-object is released.

20 Claims, 5 Drawing Sheets

SPARSE VOLUME MANAGEMENT CACHE MECHANISM SYSTEM AND METHOD

RELATED CASES

This application claims the benefit of U.S. Provisional Application No. 61/782,061 filed on 14 Mar. 2013, by Zhang et al., the contents of which are all incorporated by reference.

BACKGROUND

The use of Sparse Volume(s) in storage systems may provide storage support with volume layer management. Each Sparse Volume may be composed of multiple slices. While operating or doing IO on a Sparse Volume, the slices may actually be operated. While operating a slice, some in-memory information may need to be maintained. Thus, a slice-object may be instantiated for this information, and hold it when operating the slice. Generally, all slices are instantiated in memory, which may use up large amounts of memory.

BRIEF SUMMARY OF DISCLOSURE

In one implementation, a method, performed by one or more computing devices, may include but is not limited to instantiating, by a computing device, a slice-object associated with a slice when the slice-object is accessed. The slice-object may be released to a slice object cache when accessing is complete. It may be determined whether the slice is accessed within a threshold period of time. If the slice is accessed within the threshold period of time, the slice-object may be retrieved from the slice-object cache. If the slice is not accessed within the threshold period of time, memory used for the slice-object may be released.

One or more of the following features may be included. The memory used for the slice-object may be re-claimable when released. Release of the memory may be based upon, at least in part, a least recently used policy. A slice map entry associated with the slice-object may be read out in a slice map sector cache. If the slice map entry is accessed within the threshold period of time, the slice map entry may be retrieved from the slice map sector cache. If the slice map entry is not accessed within the threshold period of time, memory used for the slice map entry may be released. The slice map sector cache used for the slice map entry may be re-claimable when released. Release of the slice map sector cache may be based upon, at least in part, a least recently used policy.

In another implementation, a computing system includes a processor and a memory configured to perform operations that may include but are not limited to instantiating a slice-object associated with a slice when the slice-object is accessed. The slice-object may be released to a slice object cache when accessing is complete. It may be determined whether the slice is accessed within a threshold period of time. If the slice is accessed within the threshold period of time, the slice-object may be retrieved from the slice-object cache. If the slice is not accessed within the threshold period of time, memory used for the slice-object may be released.

One or more of the following features may be included. The memory used for the slice-object may be re-claimable when released. Release of the memory may be based upon, at least in part, a least recently used policy. A slice map entry associated with the slice-object may be read out in a slice map sector cache. If the slice map entry is accessed within the threshold period of time, the slice map entry may be retrieved from the slice map sector cache. If the slice map entry is not accessed within the threshold period of time, memory used for the slice map entry may be released. The slice map sector cache used for the slice map entry may be re-claimable when released. Release of the slice map sector cache may be based upon, at least in part, a least recently used policy.

In another implementation, a computer program product resides on a computer readable storage medium that has a plurality of instructions stored on it. When executed by a processor, the instructions cause the processor to perform operations that may include but are not limited to instantiating a slice-object associated with a slice when the slice-object is accessed. The slice-object may be released to a slice object cache when accessing is complete. It may be determined whether the slice is accessed within a threshold period of time. If the slice is accessed within the threshold period of time, the slice-object may be retrieved from the slice-object cache. If the slice is not accessed within the threshold period of time, memory used for the slice-object may be released.

One or more of the following features may be included. The memory used for the slice-object may be re-claimable when released. Release of the memory may be based upon, at least in part, a least recently used policy. A slice map entry associated with the slice-object may be read out in a slice map sector cache. If the slice map entry is accessed within the threshold period of time, the slice map entry may be retrieved from the slice map sector cache. If the slice map entry is not accessed within the threshold period of time, memory used for the slice map entry may be released. The slice map sector cache used for the slice map entry may be re-claimable when released. Release of the slice map sector cache may be based upon, at least in part, a least recently used policy.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
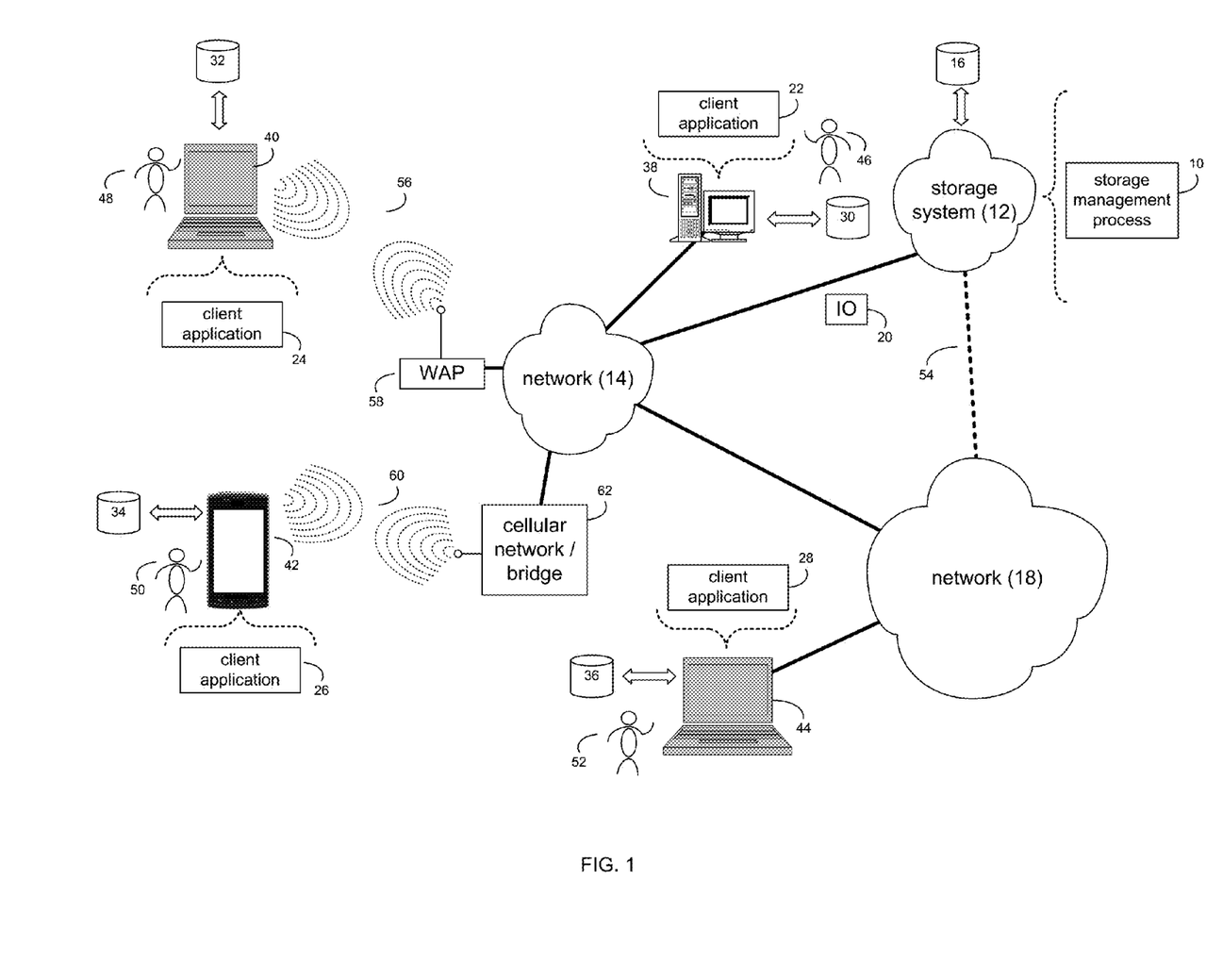
FIG. 1 is an illustrative diagrammatic view of a storage system and a storage management process coupled to a distributed computing network according to one or more implementations of the present disclosure.

System Overview:

Referring at least to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Referring still at least to FIG. 1, there is shown storage management process 10 that may reside on and may be executed by storage system 12, which may be connected to a network (e.g., network 14) (e.g., the internet or a local area network). Examples of storage system 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Storage system 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, storage management process 10 may instantiate a slice-object associated with a slice when the slice-object is accessed. The slice-object may be released to a slice object cache when accessing is complete. It may be determined whether the slice is accessed within a threshold period of time. If the slice is accessed within the threshold period of time, the slice-object may be retrieved from the slice-object cache. If the slice is not accessed within the threshold period of time, memory used for the slice-object may be released.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or storage system 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of storage management process 10 (and vice versa). Accordingly, storage management process 10 may be a purely server-side application, a purely client-side application, or a hybrid server-side/client-side application that is cooperatively executed by one or more of client applications 22, 24, 26, 28 and/or storage management process 10.

Users 46, 48, 50, 52 may access storage system 12 and storage management process 10 (e.g., using one or more of client electronic devices 38, 40, 42, 44) directly through network 14 or through secondary network 18. Further, storage system 12 may be connected to network 14 through secondary network 18, as illustrated with phantom link line 54. Storage management process 10 may include one or more user interfaces, such as browsers and textual or graphical user interfaces, through which users 46, 48, 50, 52 may access storage management process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK)

modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
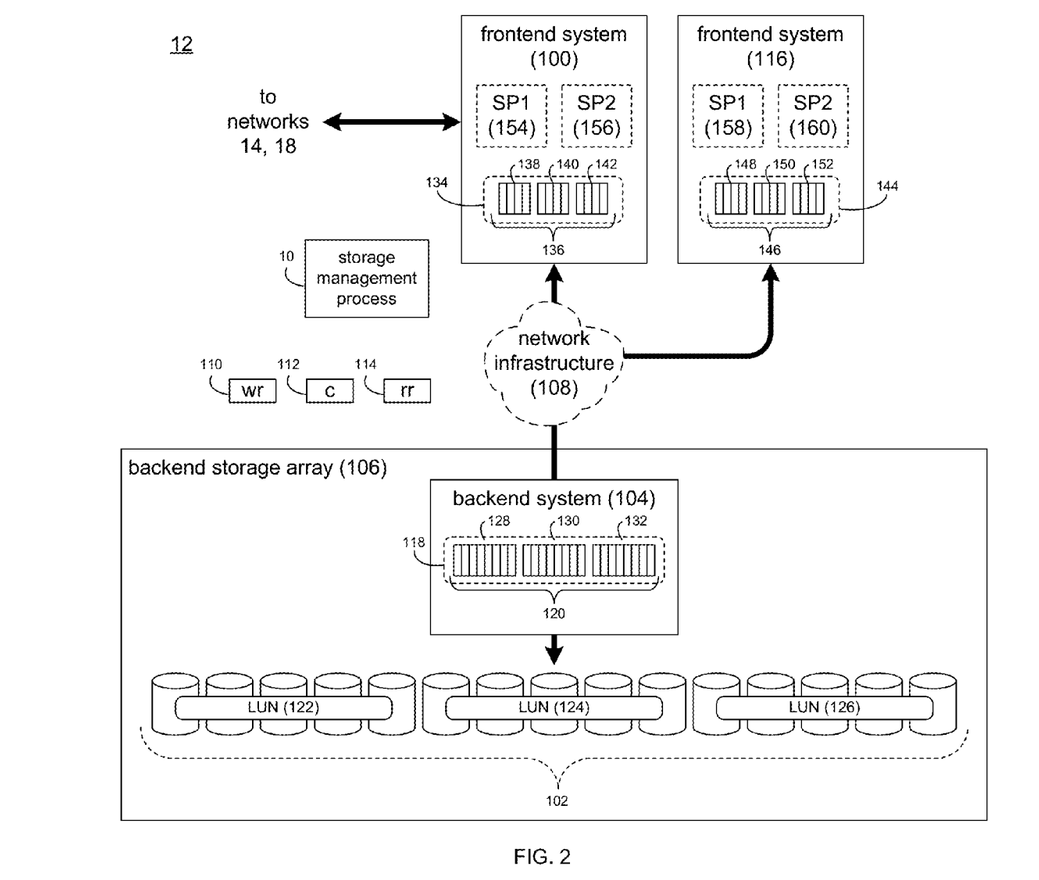
FIG. 2 is a diagrammatic view of the storage system of FIG. 1 according to one or more implementations of the present disclosure.

Referring also to FIG. 2, storage system 12 may include frontend system 100 and plurality of storage targets 102. The quantity of storage targets included within plurality of storage targets 102 may be increased or decreased depending upon, e.g., the level of redundancy/performance/capacity required.

Plurality of storage targets 102 may be configured to provide various levels of performance and/or high availability. For example, a portion of plurality of storage targets 102 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/Flash devices, wherein the combination of plurality of storage targets 102 and processing/control systems (e.g., backend system 104) may form backed storage array 106.

The manner in which storage system 12 is implemented may vary depending upon e.g. the level of redundancy/performance/capacity required. For example, storage system 12 may be a RAID device in which first frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which first frontend system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. first frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to first frontend system 100, may be executed by one or more processors (not shown) and one or more memory architectures (not shown) included within first frontend system 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g., IO request 20) may be generated. For example, these IO requests may be sent from client applications 22, 24, 26, 28 to storage system 12. Additionally/alternatively and when first frontend system 100 is configured as an application server, these IO requests may be internally generated within first frontend system 100. Examples of IO request 20 may include but are not limited to data write request 110 (i.e. a request that content 112 be written to storage system 12) and data read request 114 (i.e. a request that content 112 be read from storage system 12).

During operation of first frontend system 100, content 112 to be written to storage system 12 may be processed by first frontend system 100. Additionally/alternatively and when first frontend system 100 is configured as an application server, content 112 to be written to storage system 12 may be internally generated by first frontend system 100.

One or more additional frontend systems (e.g., second frontend system 116) may be coupled to backed storage array 106, wherein additional content (not shown) to be written to backend storage array 106 may be processed by second frontend system 116.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on first frontend system 100, some or all of the instruction sets and subroutines of storage management process 10 may be executed by one or more processors (not shown) and one or more memory architectures (not shown) included within backend system 104 of backed storage array 106.

The use of Sparse Volume(s) in storage systems may provide storage support with volume layer management. Each Sparse Volume may be composed of multiple slices. While operating or doing IO on a Sparse Volume, the slices may actually be operated. While operating a slice, some in-memory information may need to be maintained. Thus, a slice-object may be instantiated for this information, and hold it when operating the slice. Generally, all slices are instantiated in memory, (i.e., each slice may be represented by a slice-object in memory). This brings convenience that enables searching a slice-object set in memory quickly whenever accessing this slice (for IOs or other management operations). However, it may consume large amounts of memory by instantiating all slices. A slice-object may consume about 0.75 KB memory space. In some customers' large scale environment, more than 150 TB space may be used, where each slice may be 1 GB, which means instantiating all slice-objects may consume more than 150*1000*0.75 KB=112.5 MB memory space. This may consume more than 25% memory budget on, e.g., an array system. Besides the slice-objects, there may be many other system components that may need a lot of memory to be functional in such large scale environments. Thus, such memory usage may be prohibitive for such an example scenario, as it may impact the overall system capacity/scalability and performance.

When looking into the usage of the slice-objects deeply, a slice-object may generally be used only when it is accessed, but it may be rarely possible that all slice-objects are accessed at the same time. Moreover, during a short period, only some limited IOs or operations may be on-going for some limited slice-objects. All other slice-objects may be idle, i.e., the memory token by them is wasted.

One example concept may be to resolve this example issue may include "instantiating slice-object on accessing". For example, a slice generally is not instantiated by default. When it is accessed, the corresponding slice-object may be instantiated to provide access. Then, when the access is finished, the slice-object may be released and its memory space may be re-claimed.

To instantiate a slice-object, the corresponding slice information may need to be known. Such information may include, e.g., Device-ID, Device-Offset, Slice-Size. This information may be kept in the slice map entries section in the root slice of a sparse volume. In the example, this information may be read from the root slice for instantiating a slice-object. And before reading the root slice, the slice-object of root slice may also be instantiated. In some implementations, the root slice object may always be pinned in the memory, so that there may not be a need to query or re-initialize it each time. Each sparse volume may only have one root slice object, thus there may not be memory issues. As a brief summary, the sequence for instantiating a slice may include, (1) instantiating the root slice-object, (2) reading the corresponding slice map entry from the root slice to retrieve the slice information, and (3) instantiating the corresponding slice-object.

However, this process may be time-consuming because, e.g., (1) the slice-object may be too big to be constructed, and/or (2) there may be an IO for reading slice map entry. Thus, in the example, when performing one IO on a slice, it may be required to perform another IO and some big memory operation, which may impact performance.

The Storage Management Process:

As discussed above and referring also to FIGS. 3-5, storage management process 10 may instantiate 300 a slice-object associated with a slice when the slice-object is accessed. Storage management process 10 may release 302 the slice-object to a slice object cache when accessing is complete. Storage management process 10 may determine 304 whether the slice is accessed within a threshold period of time. If the slice is accessed within the threshold period of time, storage management process 10 may retrieve 306 the slice-object from the slice-object cache. If the slice is not accessed within the threshold period of time, storage management process 10 may release 308 memory used for the slice-object.

As noted above, there may be performance problem of frequently instantiating and releasing slice-objects. However, a cache mechanism may be introduced into a Sparse Volume Management component of storage management process 10. For example, in some implementations, storage management process 10 may instantiate 300 a slice-object associated with a slice when the slice-object is accessed. As noted above, to instantiate a slice-object, the corresponding slice information may need to be known. Such information may include, e.g., Device-ID, Device-Offset, Slice-Size. This information may be kept in the slice map entries section in the root slice of a sparse volume. In the example, this information may be read from the root slice for instantiating a slice-object. And before reading the root slice, the slice-object of root slice may also be instantiated. An example process flow of storage management process 10 accessing a slice may be shown at FIG. 4.

Figure 3:
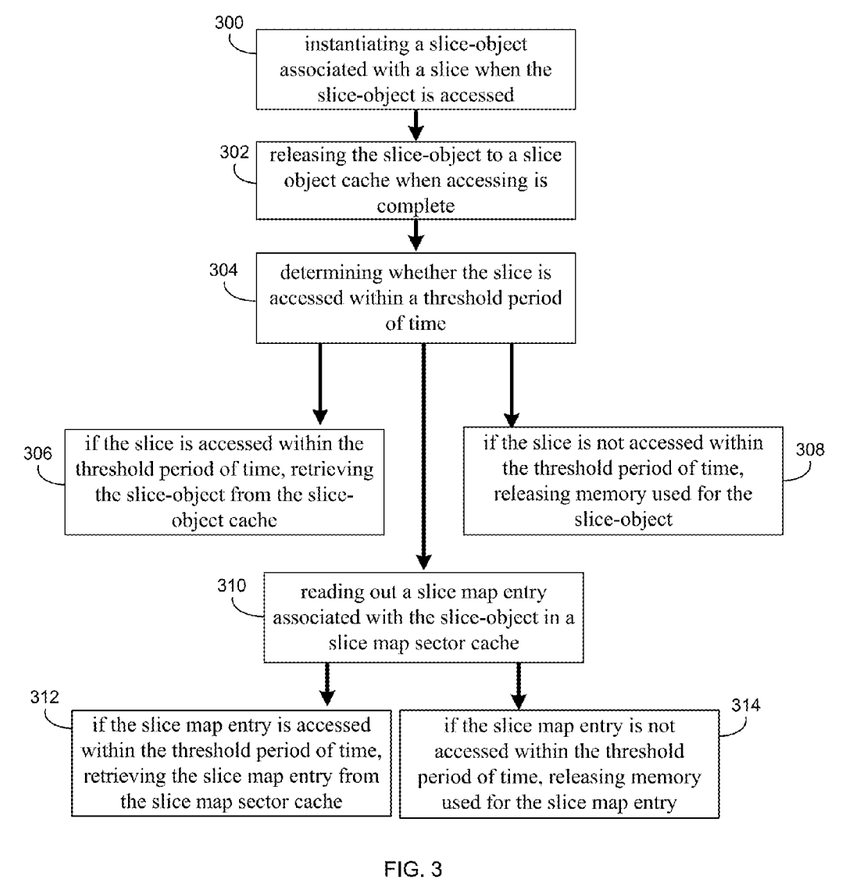
FIG. 3 is an illustrative flowchart of the cache process of FIG. 1 according to one or more implementations of the present disclosure.
Figure 4:
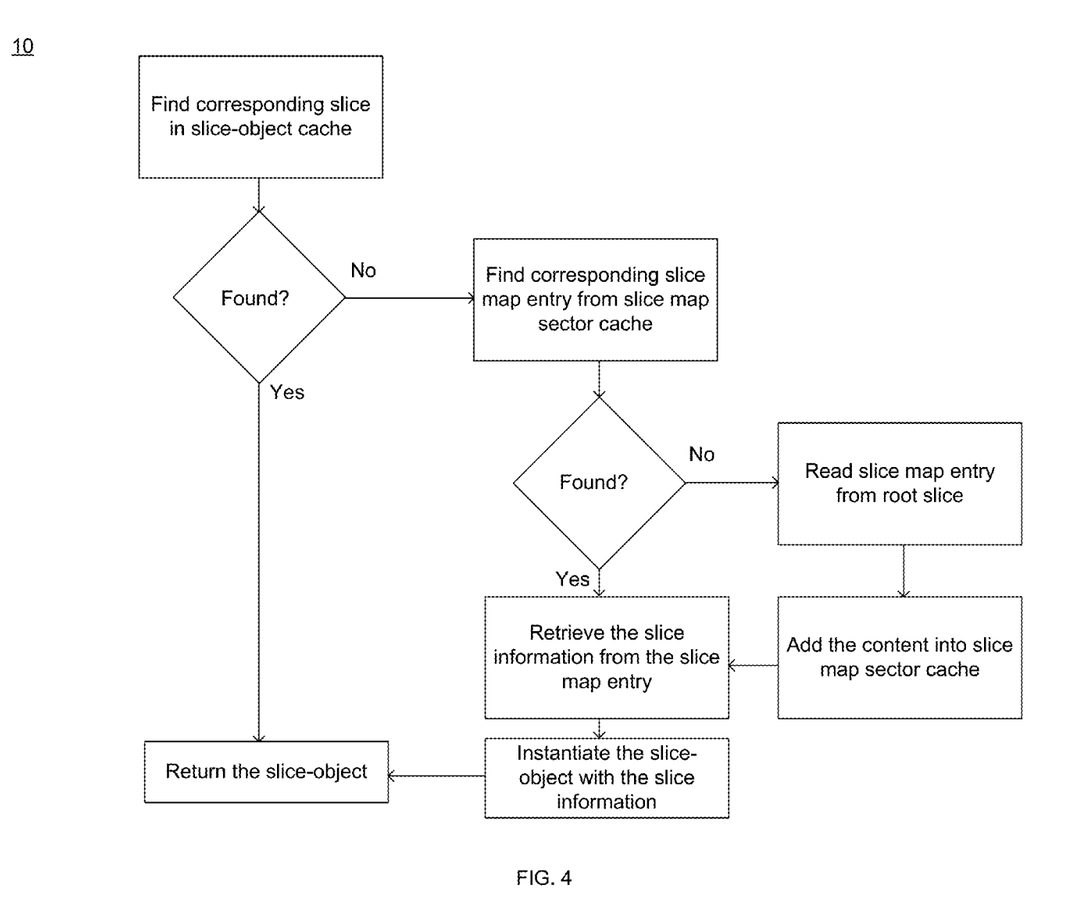
FIG. 4 is an illustrative flowchart of the cache process of FIG. 1 according to one or more implementations of the present disclosure.

In some implementations, storage management process 10 may release 302 the slice-object to a slice object cache when accessing is complete. For example, after storage management process 10 has instantiated 300 the slice-object associated with the above-noted slice, various IOs or other management operations may be performed on the slice-object. Once the various IOs or other management operations are performed, storage management process 10 may release 302 the slice-object to the slice object cache by, e.g., de-referencing the slice-object.

In some implementations, storage management process 10 may determine 304 whether the slice is accessed within a threshold period of time. For instance, assume for example purposes only that a predetermined threshold period of time is set by storage management process 10 to, e.g., three hours. In the example, storage management process 10 may determine 304 when the slice was last accessed, and thus determine 304 whether or not the slice was accessed in the slice-object cache within the three hour threshold period of time.

In some implementations, if the slice is accessed within the threshold period of time, storage management process 10 may retrieve 306 the slice-object from the slice-object cache. For instance, and continuing with the above example of a three hour threshold period of time, assume that storage management process 10 determines that the slice was accessed in the slice-object cache within two hours of the three hour threshold period of time. In the example, because the slice was accessed in the slice-object cache within two hours of the three hour threshold period of time, storage management process 10 may retrieve 306 the slice-object from the slice-object cache.

In some implementations, if the slice is not accessed within the threshold period of time, storage management process 10 may release 308 memory used for the slice-object. For instance, and continuing with the above example of a three hour threshold period of time, assume that storage management process 10 determines that the slice was accessed in the slice-object cache at four hours, which is outside of the three hour threshold period of time. In the example, because the slice was not accessed in the slice-object cache within the three hour threshold period of time, storage management process 10 may release 308 the memory that is currently being used to store the slice-object in the slice-object cache. Similarly as noted above, storage management process 10 may release 308 the slice-object from the slice object cache by, e.g., de-referencing the slice-object in the slice-object cache.

In some implementations, the memory used for the slice-object may be re-claimable when released 308. That is, when storage management process 10 releases 308 the memory that is currently being used to store the slice-object in the slice-object cache, storage management process 10 may enable that portion of the memory to be re-claimed and re-used by other slice-objects. It will be appreciated that "time" as the above-noted threshold period of time may include other thresholds. For example, in some implementations, release of the memory may be based upon, at least in part, a least recently used policy. With the least recently used (LRU) policy, the least recently used (i.e., accessed) items are the first to be discarded from the memory. As such, the discussion of "time" as the above-noted threshold period of time should be taken as an example only and not to limit the scope of the disclosure.

In some implementations, a slice map entry associated with the slice-object may be read out 310 by storage management process 10 in a slice map sector cache. For example, to resolve example performance issues caused by extra IOs for reading slice map entries, another cache (e.g., slice map sector cache)

may be introduced. In the example, when storage management process 10 reads out 310 one or more slice map entries, that information may be stored in the slice map sector cache by storage management process 10.

In some implementations, if the slice map entry is accessed within the threshold period of time, the slice map entry may be retrieved 312 from the slice map sector cache by storage management process 10. For example, if the information is re-acquired shortly, the information may be retrieved from the cache but without reading the disk. For instance, and continuing with the above example of a three hour threshold period of time, assume that storage management process 10 determines that the slice map entry was accessed in the slice map sector cache within two hours of the three hour threshold period of time. In the example, because the slice map entry was accessed in the slice map sector cache within two hours of the three hour threshold period of time, storage management process 10 may retrieve 312 the slice may entry from the slice map sector cache.

If the slice map entry is not accessed within the threshold period of time, memory used for the slice map entry may be released 314 by storage management process 10. For instance, and continuing with the above example of a three hour threshold period of time, assume that storage management process 10 determines that the slice map entry was accessed in the slice map sector cache at four hours, which is outside of the three hour threshold period of time. In the example, because the slice map entry was not accessed in the slice map sector cache within the three hour threshold period of time, storage management process 10 may release 314 the memory that is currently being used to store the slice map entry in the slice map sector cache. In some implementations, as slice map entries may be frequently used by some or all sparse volume management operations, with the slice map sector cache, the sparse volume management operations may also be benefited, thus performance may be improved.

In some implementations, the slice map sector cache used for the slice map entry may be re-claimable when released. That is, if the information is not used within the threshold period of time, the memory used to store the information may be re-claimed and re-used by other slice map entries information. Similarly as discussed above with regard to the release 308 of the memory used for the slice-object, release of the slice map sector cache may be based upon, at least in part, a least recently used policy.

Figure 5:
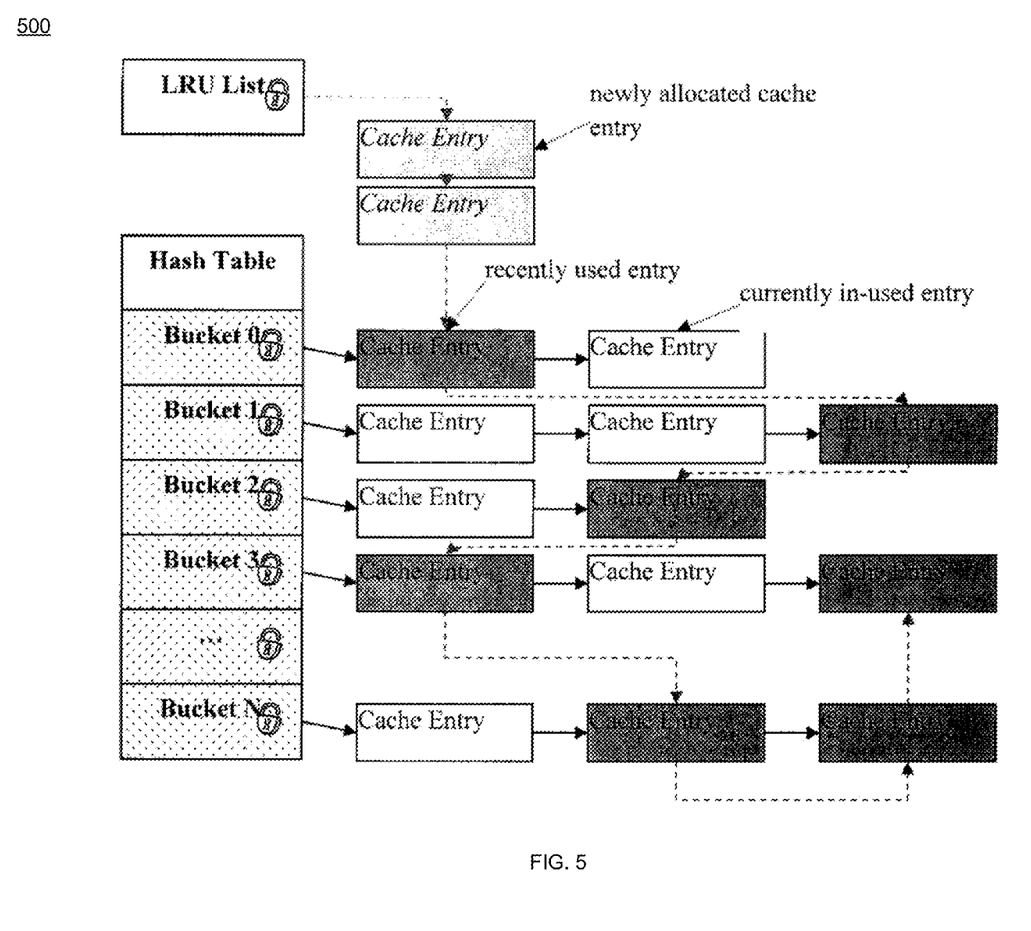
FIG. 5 is an illustrative diagrammatic view of a slice-object cache and a slice map sector cache framework according to one or more implementations of the present disclosure.

In some implementations, and referring at least to FIG. 5, the slice-object cache and the slice map sector cache may be designed into a common framework 500. In framework 400, there are shown data structures such as cache entry, hash table, hash bucket, and LRU list. For the cache entry, one entry may represent one element needed to be cached. The cache entry may be separated or combined with the objects that need to be cached. For slice map sector cache, the entry may contain a buffer hint for a slice map sector buffer. For slice object cache, the entry may be combined with the slice-object. The hash table may organize all cache entries, and may provide the search ability based on, e.g., a hash key of a cache entry. For the hash bucket, each hash bucket may have a spin lock to support synchronization. This may bring finegrain synchronization control instead of using one single lock for the whole hash table. For the LRU list, when a cache entry is not used, it may be added into the LRU list. When the cache entry is re-used, it may be removed from the LRU list. Generally, storage management process 10 may allocate new memory for a newly added cache entry. In some implementations, all of the allocation may come from small pools. The newly allocated cache entries may also be added into LRU list at the head. Thus, whenever a new cache entry is needed, it may be fetched from LRU list head. However, when the cache reaches its memory limitation, the entries in LRU list may be re-used (from head), i.e., the entries in LRU list may be removed from the cache, and then re-added into the cache with new information. In some implementations, the LRU list may have a spin lock to support synchronization.

In some implementations, unlike former approaches, since only the slice-object being accessed is instantiated in memory, the availability of memory for other components becomes larger, resulting in better memory utilization. Additionally, by controlling size of the slice object cache and slice map sector cache, the memory space for slice-objects may be forecasted and controlled more easily. This may help deploy the product target to different levels of customer, thereby providing better system configuration. Moreover, even if introducing such a cache mechanism slows down accessing the slice-object slightly (e.g., because there may be more operation performed for accessing the slice-object), the saved memory space may be used to accelerate other components, like FS cache, IO throughput, etc., so the overall system performance may be enhanced. Additionally, by improving the memory utilization, the cache mechanism may enable more slices being supported. The system capacity and scalability are thus extended to provide better system capacity/scalability.

General:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), or programmable logic arrays (PLA) may execute the computer readable program instructions/code by utilizing state information of the computer readable program instructions to personalize the electronic circuitry, in order to perform aspects of the present disclosure.

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   instantiating, by a computing device, a slice-object associated with a slice when the slice-object is accessed;
   releasing the slice-object to a slice object cache when accessing is complete;
   determining whether the slice is accessed within a threshold period of time; and if the slice is accessed within the threshold period of time, retrieving the slice-object from the slice-object cache, and if the slice is not accessed within the threshold period of time, releasing memory used for the slice-object.

2. The computer-implemented method of claim 1 wherein the memory used for the slice-object is re-claimable when released.

3. The computer-implemented method of claim 2 wherein release of the memory is based upon, at least in part, a least recently used policy.

4. The computer-implemented method of claim 1 further comprising reading out a slice map entry associated with the slice-object in a slice map sector cache.

5. The computer-implemented method of claim 4 wherein if the slice map entry is accessed within the threshold period of time, retrieving the slice map entry from the slice map sector cache.

6. The computer-implemented method of claim 5 wherein if the slice map entry is not accessed within the threshold period of time, releasing memory used for the slice map entry.

7. The computer-implemented method of claim 6 wherein the slice map sector cache used for the slice map entry is re-claimable when released, and wherein release of the slice map sector cache is based upon, at least in part, a least recently used policy.

8. A computer program product residing on a non-transitory computer readable storage medium having a plurality of instructions stored thereon which, when executed by a processor, cause the processor to perform operations comprising:

instantiating a slice-object associated with a slice when the slice-object is accessed;

releasing the slice-object to a slice object cache when accessing is complete;

determining whether the slice is accessed within a threshold period of time; and if the slice is accessed within the threshold period of time, retrieving the slice-object from the slice-object cache, and if the slice is not accessed within the threshold period of time, releasing memory used for the slice-object.

9. The computer program product of claim 8 wherein the memory used for the slice-object is re-claimable when released.

10. The computer program product of claim 9 wherein release of the memory is based upon, at least in part, a least recently used policy.

11. The computer program product of claim 8 further comprising reading out a slice map entry associated with the slice-object in a slice map sector cache.

12. The computer program product of claim 11 wherein if the slice map entry is accessed within the threshold period of time, retrieving the slice map entry from the slice map sector cache.

13. The computer program product of claim 12 wherein if the slice map entry is not accessed within the threshold period of time, releasing memory used for the slice map entry.

14. The computer program product of claim 13 wherein the slice map sector cache used for the slice map entry is re-claimable when released, and wherein release of the slice map sector cache is based upon, at least in part, a least recently used policy.

15. A computing system including a processor and a memory configured to perform operations comprising:

instantiating a slice-object associated with a slice when the slice-object is accessed;

releasing the slice-object to a slice object cache when accessing is complete;

determining whether the slice is accessed within a threshold period of time; and if the slice is accessed within the threshold period of time, retrieving the slice-object from the slice-object cache, and if the slice is not accessed within the threshold period of time, releasing memory used for the slice-object.

16. The computing system of claim 15 wherein the memory used for the slice-object is re-claimable when released.

17. The computing system of claim 16 wherein release of the memory is based upon, at least in part, a least recently used policy.

18. The computing system of claim 15 further comprising reading out a slice map entry associated with the slice-object in a slice map sector cache.

19. The computing system of claim 18 wherein if the slice map entry is accessed within the threshold period of time, retrieving the slice map entry from the slice map sector cache.

20. The computing system of claim 19 wherein if the slice map entry is not accessed within the threshold period of time, releasing memory used for the slice map entry.

* * * * *